C. H. ANGELL
July 18, 1933. TREATMENT OF HYDROCARBON OIL Re. 18,899
Original Filed Feb. 11, 1932
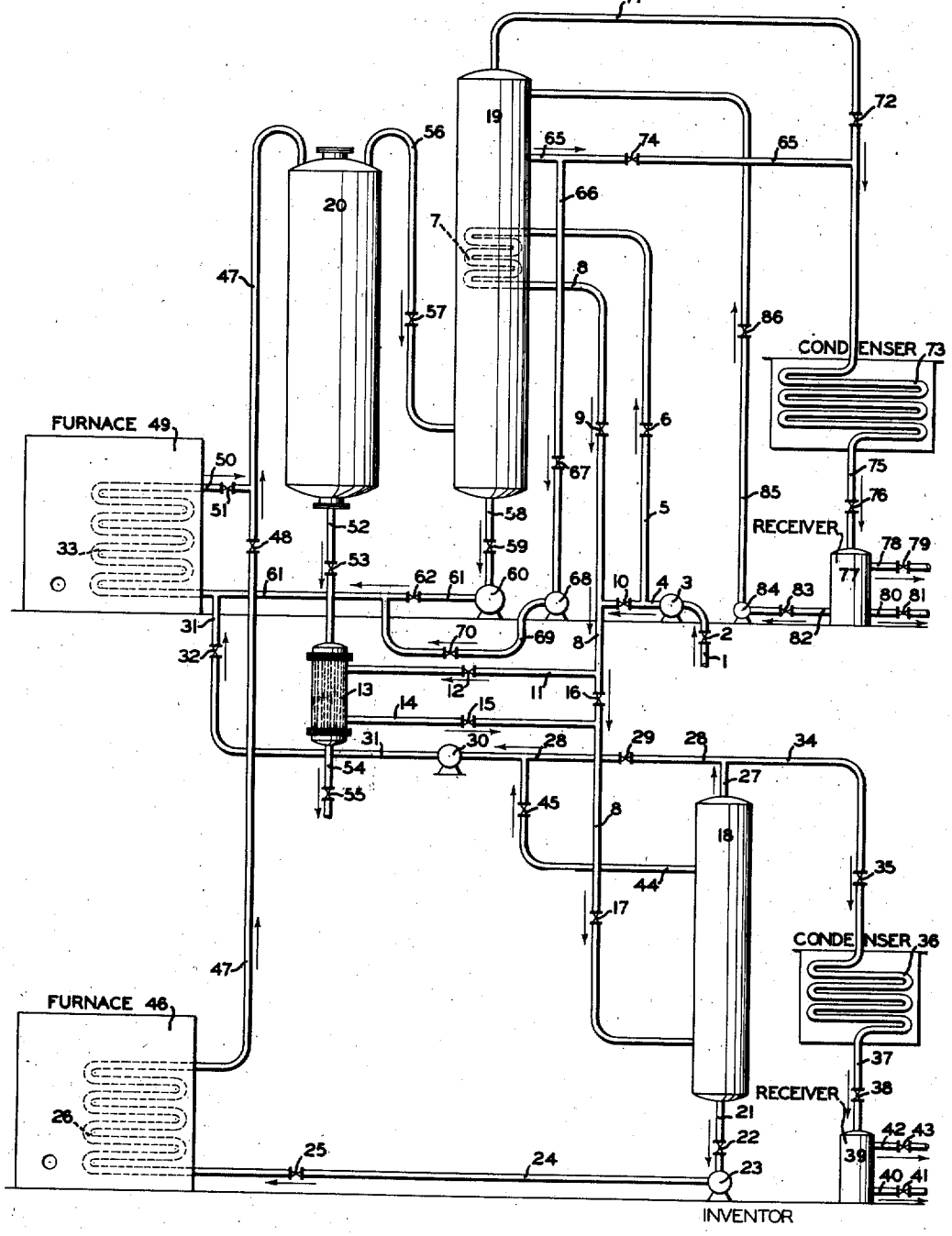
INVENTOR
CHARLES H. ANGELL
BY Frank L. Belknap
ATTORNEY Reissued July 18, 1933

Re. 18,899

UNITED STATES PATENT OFFICE

CHARLES H. ANGELL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

TREATMENT OF HYDROCARBON OIL

Original No. 1,897,628, dated February 14, 1933, Serial No. 592,232, filed February 11, 1932. Application for reissue filed April 13, 1933. Serial No. 666,018.

This invention relates to the treatment of hydrocarbon oil, and more particularly refers to an improved process and apparatus for the production of maximum yields of desirable light products, such as motor fuels of high anti-knock value, from crude or other hydrocarbon oils containing gasoline or gasoline fractions of inferior anti-knock value and/or other light fractions suitable for reforming.

An object of the present invention is to provide an improved continuous process and a unified apparatus wherein crude oil is separated into components of substantially motor fuel boiling range of low anti-knock value and higher boiling components, wherein said higher boiling components are converted for the production of additional yields of good quality motor fuel and wherein said inferior motor fuel components of the crude are subjected to treatment, together with intermediate conversion products of the process for the purpose of improving the anti-knock value of the inferior motor fuel and producing additional yields of good quality motor fuel from said intermediate conversion products.

I am aware of existing patents involving the separate treatment of reflux condensate from the fractionator of a cracking system under independently controlled temperature and pressure conditions in a heating element separate from that in which the raw oil charging stock is treated. Attention is directed to the fact that while the advantageous feature of subjecting the intermediate conversion products of the cracking operation (reflux condensate) to more severe conversion conditions than those imposed upon the heavy portions of the charging stock is embodied in the present invention it combines this feature in a novel manner with an operation for reforming or converting gasoline, gasoline fractions or other light components of crude oil, and the invention is further distinguished from the prior art by the fact that it is specifically directed to the treatment of crude or other hydrocarbon oils containing gasoline or gasoline fractions of inferior anti-knock value and combines, in an advantageous manner, the topping, cracking and reforming operations in a single unified system. The distinct advantages which accrue to the benefit of the present invention in the form of the elimination of equipment and heat economy by accomplishing topping, cracking and reforming operations in a single unified system will be apparent to those familiar with modern refining practice. By commingling the intermediate conversion products of the cracking operation with the crude oil fractions to be reformed, as specifically provided by the present invention, a blend of relatively light hydrocarbon oil is formed, which may be converted under the conditions defined in the present invention, to produce maximum yields of motor fuel of high anti-knock value while over-conversion of the heavier components of the charging stock (topped crude) and the resulting excessive formation of coke and uncondensable gas is avoided by subjecting this material to separate treatment under milder conversion conditions.

One specific embodiment of the invention comprises subjecting a crude oil containing a substantial proportion of gasoline or gasoline fractions to fractional distillation, by means of heat recovered from relatively hot products of the system, to effect separation of the crude into components substantially within motor fuel boiling range and heavier fractions, subjecting said heavier fractions of the crude to conversion conditions in a heating element, introducing the heated material into an enlarged reaction zone wherein vaporous and non-vaporous products of the system are separated, subjecting the vapors to fractionation whereby their relatively light desirable components are separated from intermediate conversion products, subjecting said intermediate conversion products to further conversion in a separate heating element, introducing the heated products into said reaction zone and simultaneously supplying to said separate heating element the motor fuel components of the crude whereby their anti-knock value is materially improved under the conditions employed in said separate heating element.

It is within the scope of the invention to subject to reforming only a portion of the straight-run gasoline separated from the crude oil rather than the entire product. This method of operation has been found advantageous, particularly in decreasing the gas losses and increasing the yield of motor fuel, when materials which produce detonation are largely concentrated in a certain portion (usually the relatively heavy components) of a gasoline, and when other portions of the gasoline (usually its relatively light components) do not necessarily require reforming to improve their anti-knock value, particularly when they are to be subsequently blended with good quality cracked motor fuel.

It is also within the scope of the invention to include, in the straight run motor fuel components which are subjected to reforming, higher boiling components of the crude, such as naphtha, selected naphtha fractions, etcetera, or when the straight-run gasoline has an anti-knock value sufficiently good to require no reforming only intermediate components of the crude may be subjected to conversion together with intermediate conversion products from the system. Another alternative provided by the present invention permits returning a portion (preferably the relatively heavy components) of the cracked motor fuel product, or more strictly speaking, a blend of the cracked motor fuel product and the reformed straight-run gasoline, to further treatment in the heating element in which the straight-run gasoline is reformed. This feature serves as a means of controlling and further improving the anti-knock value of the final motor fuel product of the system, particularly when materials which cause detonation are concentrated principally in the heavier components of said motor fuels.

The attached diagrammatic drawing illustrates one form of apparatus embodying the present invention. The following description of the drawing includes a description of the invention as it may be practiced in the particular form of apparatus illustrated.

Raw oil charging stock for the system, which may comprise crude petroleum or any other hydrocarbon oil containing a substantial proportion of gasoline or materials substantially within the boiling range of gasoline may be supplied through line 1 and valve 2 to pump 3, from which it is fed through line 4 and may pass through line 5 and valve 6, preheating coil 7, line 8 and valve 9, or may pass directly through valve 10 in line 4 into line 8. The raw oil from line 8 may pass through line 11 and valve 12, heat exchanger 13, line 14 and valve 15 back into line 8 or directly through valve 16 in line 8, passing thence, in either case, through valve 17 in line 8 into topping and fractionating column 18. Preheating coil 7 is located within fractionator 19 and the raw oil fed therethrough receives heat by indirect contact with relatively hot vapors in this zone. The oil passing through heat exchanger 13 recovers heat from the residual conversion products of the system withdrawn from reaction chamber 20, as will be later more fully described. It will be understood that other means of preheating the crude and supplying the heat required to top it may be employed, if desired, either alone or in conjunction with the methods illustrated. For example, heat may be recovered from furnace gases from the system, or, if desired, heat from an external source may be utilized.

Topping and fractionating column 18 may contain any suitable form of fractionating means, such as perforated pans, bubble trays, packing, or the like, and the preheated crude oil is substantially vaporized in the lower portion of this zone.

The relatively heavy component of the crude, preferably comprising its components boiling above the range of gasoline, remain unvaporized or are condensed by fractionation in column 18, and are withdrawn from the fractionator through line 21 and valve 22 to pump 23. Pump 23 supplies the topped crude through line 24 and valve 25 to heating element 26.

The relatively light components of the crude, preferably comprising materials of substantially gasoline boiling range, may be withdrawn from the upper portion of column 18 through line 27 and may be directed through line 28 and valve 29 to pump 30 by means of which they are supplied through line 31 and valve 32 to heating element 33.

When desired fractionation may be so controlled in column 18 that only the relatively light fractions of the straight-run gasoline, which may not require reformation, may be withdrawn from the upper portion of the fractionator through line 27, in which case this portion passes through line 34 and valve 35 to be subjected to condensation and cooling in condenser 36, distillate and uncondensable gas from which pass through line 37 and valve 38 to be collected in receiver 39.

The distillate may be withdrawn from receiver 39 through line 40 and valve 41, preferably to be blended with the other motor fuel products of the system. Uncondensable gas may be released from the receiver through line 42 and valve 43. A portion of the distillate from receiver 39 may, when desired, be recirculated by well known means (not shown) to the upper portion of column 18 to assist fractionation of the vapors and to maintain the desired vapor outlet temperature from this zone.

In case the type of operation last described is employed in column 18, the relatively heavy components of the straight-run gasoline which require reformation to improve their anti-knock value or intermediate crude oil fractions, such as naphtha, et cetera, or both naphtha and poor anti-knock motor fuel fractions, may be withdrawn as a side stream from column 18 through line 44 and valve 45 and through line 28 to pump 30, from which this portion of the crude oil is fed through line 31 and valve 32 to heating element 33.

Heating element 26 is located in any suitable form of furnace 46 and the oil supplied to this zone is heated to the desired conversion temperature, preferably at a substantial superatmospheric pressure, passing therefrom through line 47 and valve 48 to reaction chamber 20.

Heating element 33 is located in a furnace 49 of any suitable form and the oil supplied to this zone is subjected to conditions of elevated temperature and, preferably, substantial superatmospheric pressure. The heated materials from heating element 33 pass through line 50 and valve 51 into line 47, commingling therein with the heated materials from heating element 26 and passing therewith to reaction chamber 20. It will be understood that, if desired, products from heating element 26 and products from heating element 33 may be introduced into chamber 20 through independent lines (not shown), each line entering at any desired point in the chamber, instead of commingling the products in line 47, as illustrated in the drawing.

Chamber 20 is preferably also maintained at a substantial superatmospheric pressure and the materials supplied to this zone are separated into vapors and non-vaporous products. The non-vaporous products may be withdrawn as residual oil through line 52 and valve 53 passing, if desired, through heat exchanger 13 for the purpose of furnishing heat to the raw oil charging stock and passing therefrom through line 54 and valve 55 to further cooling and storage, or to any desired further treatment. When it is desired to operate the process on a non-residuum basis, conditions may be so controlled in chamber 20 that the residual products in this zone are reduced to coke which may collect in the chamber to be removed after the operation of the process is discontinued.

Vapors from chamber 20 pass through line 56 and valve 57 to fractionation in fractionator 19, wherein their relatively heavy insufficiently converted components are separated from their lighter desirable components. Said relatively heavy components collect as reflux condensate in the lower portion of fractionator 19 and are withdrawn through line 58 and valve 59 to pump 60, from which they are fed through line 61 and valve 62 to heating element 33 for further treatment.

Fractionation may be so controlled in fractionator 19 that the entire cracked and reformed motor fuel products of the system, of the desired end boiling point are removed as vapors from the top of the fractionator or, when desired, only the lighter boiling components of the cracked and reformed motor fuel product are removed as vapors, their heavier components being withdrawn as a side stream from the fractionator. In the latter case, a portion of said side stream withdrawn from fractionator 19 through line 65 is directed through line 66 and valve 67 to pump 68 by means of which it is returned through line 69 and valve 70 and line 61 to heating element 33 for further treatment, thus serving as a means of regulating the quality of the finished product, particularly with respect to its anti-knock value. Vapors removed from the top of fractionator 19 pass through line 71 and valve 72 to condensation and cooling in condenser 73. In case the side stream is withdrawn, as described, from fractionator 19, that portion which is not returned to heating element 33 passes through valve 74 in line 65 and commingles in line 71 with the vapors withdrawn from the top of the fractionator, passing therewith to condenser 73. Distillate and uncondensable gas are withdrawn from condenser 73 through line 75 and valve 76 to collection in receiver 77. Uncondensable gas may be released from the receiver through line 78 and valve 79. Distillate may be withdrawn through line 80 and valve 81. A portion of the distillate from receiver 77 may be withdrawn through line 82 and valve 83 to be recirculated by means of pump 84 through line 85 and valve 86 to the upper portion of fractionator 19, to assist fractionation of the vapors and to maintain the desired vapor outlet temperature from this zone, thus regulating the end boiling point of the vapors removed from the fractionator.

The heating element of the system wherein the topped crude is treated preferably utilizes a relatively mild conversion temperature of the order of 800 to 950° F. and substantial superatmospheric pressure of the order of 100 to 500 pounds or thereabouts per square inch. The heating element devoted to the treatment of reflux condensate and gasoline or other light fractions to be reformed or converted, preferably utilizes more severe conversion conditions of the order of 900 to 1050° F. with substantial superatmospheric pressures ranging, for example, from 200 to 800 pounds or more per square inch. The pressure utilized in the reaction chamber may be substantially equalized with or somewhat reduced, relative to the pressure employed in the heating element employing the lowest pressure and may be substantially equalized or somewhat reduced in the succeeding fractionating, condensing and collecting equipment. The topping and fractionating column is preferably operated at substantially atmospheric or relatively low superatmospheric pressure although substantial superatmospheric or sub-atmospheric pressures may be employed when desired.

The following is an example of the operation of the process utilizing a 38° A. P. I. gravity Pennsylvania fuel oil containing about 28% of straight-run gasoline as charging stock for the process. The crude oil is preheated by heat recovered from the system to a temperature of approximately 600° F. and materials boiling up to approximately 500° F. are topped from the crude at substantially atmospheric pressure and subjected in the reforming coil to a temperature of about 950° F. under a superatmospheric pressure of approximately 500 pounds per square inch. The topped crude is subjected in the cracking coil of the system to a temperature of approximately 890° F. under a superatmospheric pressure of about 350 pounds per square inch. Reflux condensate from the fractionator of the cracking system is returned to the reforming coil for further conversion. This operation will yield approximately 72% of motor fuel having an anti-knock value approximately equivalent to a blend of 75% iso-octane and 25% normal heptane. In addition, about 16% of residual oil suitable for sale as fuel will be produced, the remaining 12%, based on the charging stock, being chargeable to gas, loss and a relatively small amount of coke or carbonaceous material.

It will be understood that the foregoing example is illustrative of only one of the many types of operation involving the features of the present invention and does not limit the invention to this or any other specific charging stock or set of operating conditions.

I claim as my invention:

1. A process of hydrocarbon oil conversion, which comprises subjecting a crude hydrocarbon oil containing fractions within the boiling range of motor fuel to fractional distillation to effect separation of the crude into components substantially within motor fuel boiling range and heavier fractions, subjecting said heavier fractions to conversion conditions of temperature and superatmospheric pressure in a heating coil, introducing the heated material into an enlarged reaction zone wherein vaporous and non-vaporous products are separated, subjecting the vapors to fractionation whereby their relatively light desirable components are separated from intermediate conversion products, subjecting said intermediate conversion products to further conversion in a separate heating coil, introducing the heated products from said separate heating coil into said reaction zone and simultaneously supplying to said separate heating coil motor fuel components of the crude whereby their anti-knock value is materially improved under the conditions employed in said second heating coil.

2. A process of hydrocarbon oil conversion, which comprises subjecting a crude hydrocarbon oil containing fractions within the boiling range of motor fuel to fractional distillation by indirect contact with hot products of the process to effect separation of the crude into components substantially within motor fuel boiling range and heavier fractions, subjecting said heavier fractions to conversion conditions of temperature and superatmospheric pressure in a heating coil, introducing the heated material into an enlarged reaction zone wherein vaporous and non-vaporous products are separated, removing the non-vaporous residues and isolating same from the process, subjecting the vapors to fractionation whereby their relatively light desirable components are separated from intermediate conversion products, subjecting said intermediate conversion products to further conversion in a separate heating coil, introducing the heated products from said separate heating coil into said reaction zone and simultaneously supplying to said separate heating coil motor fuel components of the crude whereby their anti-knock value is materially improved under the conditions employed in said heating coil.

3. A process such as is claimed in claim 2, wherein the material being fed through the second heating coil is subjected to a higher temperature than the oil being fed through the first heating coil.

4. A process of hydrocarbon oil conversion, which comprises subjecting a crude hydrocarbon oil containing fractions within the boiling range of motor fuel to fractional distillation to effect separation of the crude into components substantially within motor fuel boiling range and heavier fractions, subjecting said heavier fractions to conversion conditions of temperature and superatmospheric pressure and separating the resulting products in an enlarged reaction zone into vapors and residue, subjecting the vapors to fractionation whereby their relatively light desirable components are separated from intermediate conversion products, heating said intermediate conversion products to conversion temperature independently of said heavier fractions in an independent heating zone, introducing the heated intermediate products from said independent heating zone into said reaction zone and simultaneously supplying to said independent heating zone motor fuel components of the crude whereby their anti-knock value is materially improved under the conditions employed in said independent heating zone.

CHARLES H. ANGELL.